United States Patent [19]
Jones et al.

[11] Patent Number: 5,936,382
[45] Date of Patent: Aug. 10, 1999

[54] BATTERY ELECTROLYTE LEVEL MONITOR

[75] Inventors: William E. M. Jones, P. O. Box F42533, Water Edge, Freeport, Bahamas; Evert C. Weidner, Lansdale, Pa.

[73] Assignee: William E. M. Jones, Freeport, Bahamas

[21] Appl. No.: 09/017,173

[22] Filed: Feb. 2, 1998

[51] Int. Cl.$^6$ .................................................. H01M 10/46
[52] U.S. Cl. ................................ 320/132; 320/DIG. 21; 324/425
[58] Field of Search ................................ 320/132, 134, 320/136, DIG. 18, FOR 142, DIG. 21, FOR 147; 324/425, 426, 432, 446; 340/635

[56] References Cited

U.S. PATENT DOCUMENTS

| | | | |
|---|---|---|---|
| 3,696,362 | 10/1972 | Sieron | 340/620 |
| 4,247,811 | 1/1981 | Findl | 320/134 |
| 4,284,951 | 8/1981 | Dahl et al. | 324/430 |
| 4,625,201 | 11/1986 | Berry | 340/636 |
| 4,913,987 | 4/1990 | Dattilo | 324/436 |
| 4,981,764 | 1/1991 | Dattilo | 324/436 |

OTHER PUBLICATIONS

Motive Energy Inc. product information circular detailing the features of and benefits to using their "Hydro–Eye" battery vent cap; publication date unknown.

Battery Master Inc. product information circular detailing the features of and benefits to using their "The Informer" electrolyte level monitor; publication date unknown.

Advanced Control Technology, Inc. product information circular detailing the features of and benefits to using their multiple switch liquid level monitor; publication date unknown.

New product announcement letter (unaddressed) from Janet L. Maurer, Director of Marketing for Philadelphia Scientific, detailing the features of and benefits to using their battery watering monitor, dated Jul. 23, 1996 (1 page w/enclosed 1 page battery watering monitor installation instructions).

*Primary Examiner*—Edward H. Tso
*Attorney, Agent, or Firm*—Synnestvedt & Lechner LLP

[57] ABSTRACT

An electrolyte level monitor used in combination with a battery having multiple cells. The monitor includes a circuit having an indicator which operates when the electrolyte level is at or above the minimum acceptable electrolyte level. The circuit is connected across cells of the battery to provide a potential to operate the monitor.

25 Claims, 4 Drawing Sheets

BATTERY ELECTROLYTE LEVEL MONITOR

BACKGROUND

1. Field of the Invention

The present invention relates to devices for monitoring the level of electrolyte in rechargeable aqueous electric storage batteries. More particularly, the present invention relates to a device for providing a positive indication that the minimum acceptable level of electrolyte is present in a battery cell.

2. Background of the Invention

Rechargeable or secondary electric storage batteries often contain an aqueous electrolyte, such as a dilute sulfuric acid in lead acid systems. These batteries have multiple cells connected in series and are widely used in many applications such as electric vehicles.

During normal use, the water in the electrolyte solution is depleted by the electrolysis that accompanies the charging process and for other reasons such as charge inefficiencies. This water loss needs to be replaced before a low electrolyte level results in damage to the battery cells. Thus, such batteries are typically "topped off" or replenished with water before permanent damage to the battery components result.

A long recognized problem in the industry has been the determination of when to add additional water. The actual point of time when topping off is required is not easily determinable as battery utilization varies greatly with each application. Regular visual monitoring, such as looking into the battery cell, is typically required. Nevertheless, a main cause of battery failure is due to the lack of water. Furthermore, too frequent watering without proper visual monitoring can lead to overfilling and spilling of electrolyte.

Various devices are known in the art for monitoring electrolyte levels. Some of these units are deficient in that they are not fail safe. These units provide a positive indication, such as a light, only when the electrolyte liquid level falls below the minimum acceptable level. Such units are not capable of differentiating between a low electrolyte level and a failed monitor device. If no indication is given, it could mean that the electrolyte level is okay, or it could be that the unit has failed, in which case reliance on the monitor could result in a damaged battery.

More recently, supposedly fail safe monitors have been introduced. Such monitors are placed within the battery cell and positioned at a predetermined minimum acceptable electrolyte level to contact the electrolyte and give a positive indication when the electrolyte is just at the minimum acceptable level or higher. Such systems would have the advantage that a positive signal means that the liquid level is acceptable. If no indication were given, either the liquid level is low or the monitor is not working. In either event, the lack of a positive indication would mean that something is wrong and that further investigation is required.

These supposed fail safe devices, however, have in reality failed. It has been found that such devices can give a false signal indicating that the electrolyte level is acceptable when in fact the electrolyte is below the minimum acceptable level.

Accordingly, one object of the present invention is to provide a monitoring device which provides a positive indication when the electrolyte is at the minimum acceptable level.

Another object is to provide a monitor that is fail safe and not prone to false indications.

A further object of the present invention is to provide a simple and reliable monitoring device that has no moving parts to fail and that is virtually maintenance free.

Another object of the present invention is to provide a monitoring device that does not require a separate power source which can be depleted or fail.

Additional objects, advantages and novel features of the invention will be set forth in the description which follows, and in part should become apparent to those skilled in the art upon examination of the following or may be learned by practice of the invention.

SUMMARY OF THE INVENTION

In making the present invention, the inventors believe they have solved a problem previously unappreciated by others in the art. As the battery cell ages, oils are liberated from materials within the battery. These oils form an oil film that coats all exposed surfaces within the cell. This film is conductive and can provide a weak short circuit from the electrolyte to any device or item within the battery cell. The inventors have determined that this is likely the reason why previous fail safe monitoring devices give false signals. A weak short circuit from the electrolyte to the monitoring device can give a false indication of electrolyte level.

The inventors have developed a novel monitor which overcomes this problem, and which provides a true fail safe device. In broad terms, the monitor provides an electric circuit having a first terminal which is positioned in one of the cells of the battery at a minimum acceptable electrolyte level. The electric circuit has a second terminal which is electrically connected to a second cell of the battery to impress a potential across the circuit when the electrolyte in the one cell to be monitored contacts the first terminal of the circuit. An indicator that is responsive to a flow of current is electrically connected in series between the first and second terminals of the circuit. Connected electrically in parallel with the indicator is a resistor. When the electrolyte level contacts the first terminal of the circuit, current flows through the circuit and a positive indication of the current is given. When the electrolyte level falls below the desired electrolyte level the circuit is opened, and no indication is given indicating that either the electrolyte level is low or that the electrolyte level monitor has failed.

DETAILED DESCRIPTION OF THE PREFERRED EMBODIMENT

The preferred embodiment illustrated is not intended to be exhaustive or to limit the invention to the precise form disclosed. It is chosen and described to best explain the principle of the invention and its application and practical use and to enable others skilled in the art to best utilize the invention.

Figure 1:
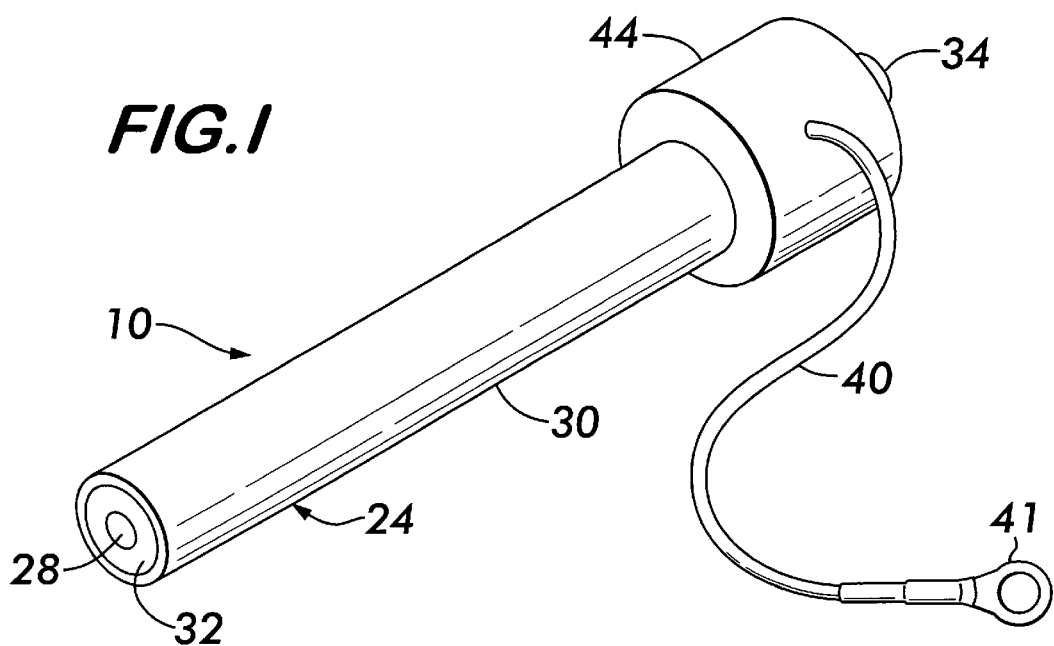
FIG. 1 is a perspective view of a preferred embodiment of an electrolyte monitor in accordance with the present invention.
Figure 2:
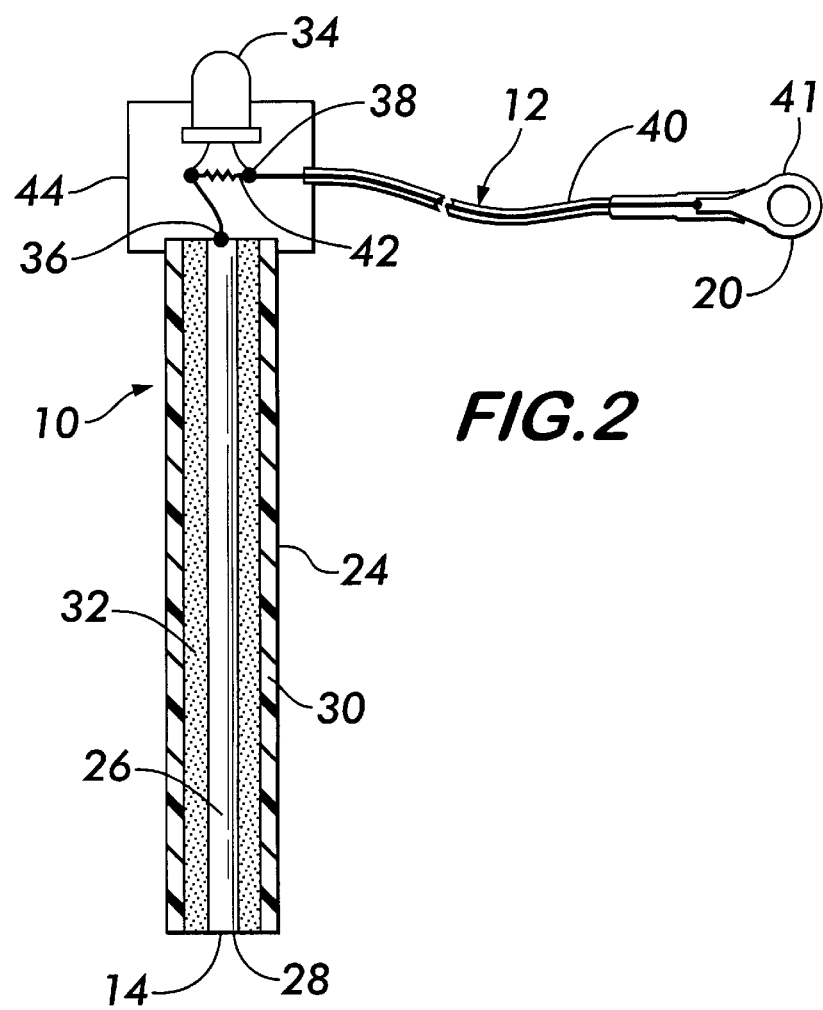
FIG. 2 is a sectional view of the electrolyte monitor of FIG. 1.
Figure 4:
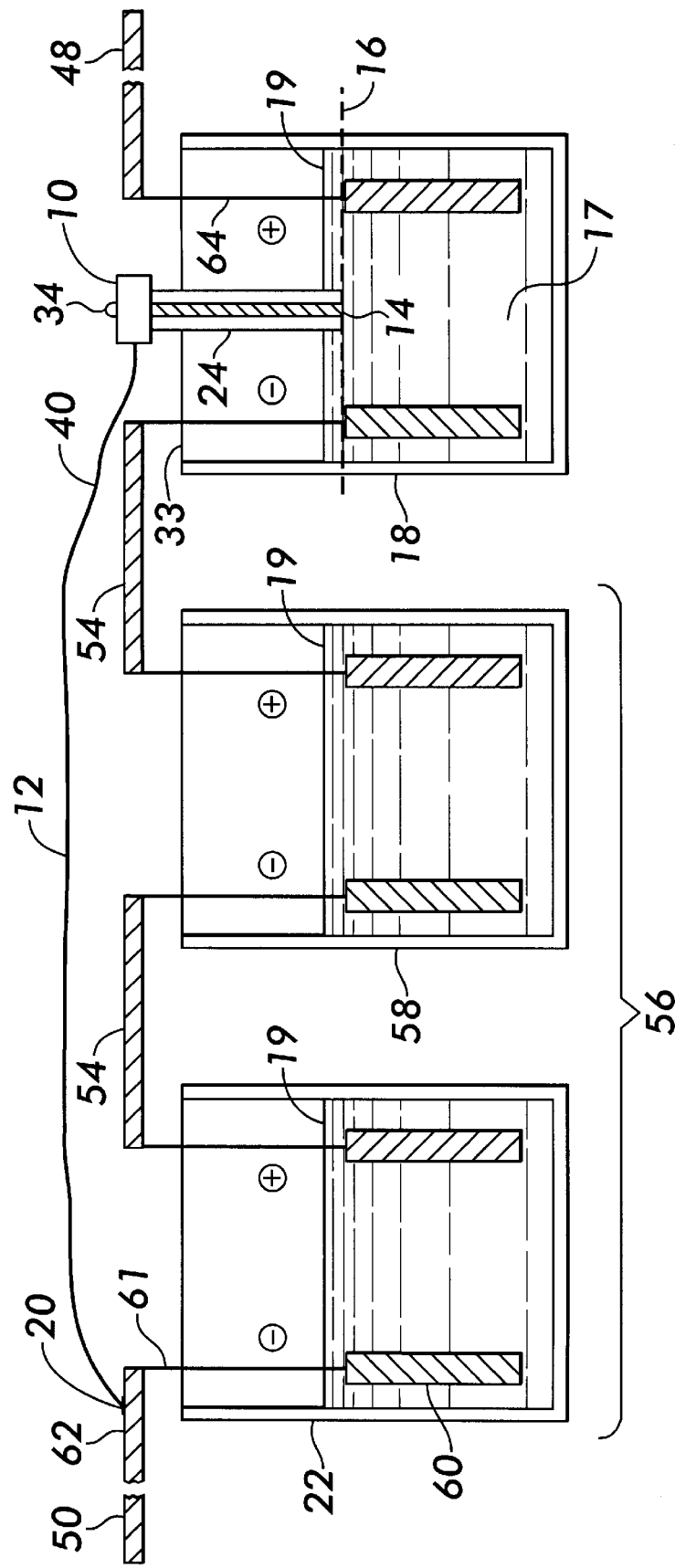
FIG. 4 is a schematic view of the completed circuit of the electrolyte monitor of FIG. 1 shown connected across a driving cell string of two cells.
Figure 5:
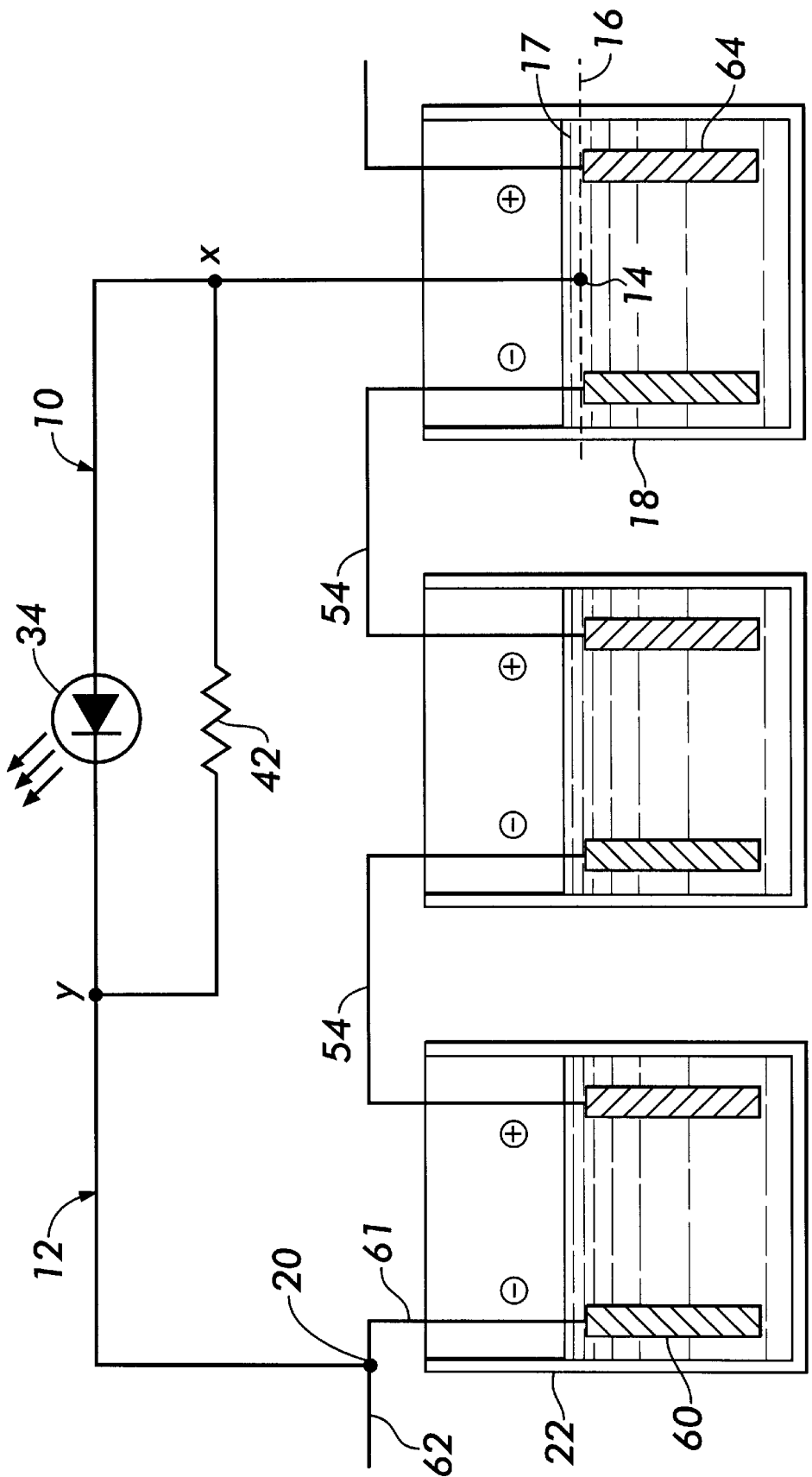
FIG. 5 is a schematic diagram of a monitor circuit of the present invention.

Illustrated in FIGS. 1, 2 and 5 is an electrolyte monitor 10 of the present invention. The monitor 10 comprises an electric circuit 12 having a first terminal 14 to be positioned to contact the electrolyte 17 at a minimum acceptable electrolyte level 16 in a cell 18 which has been selected to be monitored (see FIG. 4) (this monitored cell is alternately referred to as the pilot cell), and a second terminal 20 to be electrically connected to a second cell 22 (see FIG. 4) to impress a potential across the circuit 12 as further discussed below.

In the illustrated embodiment, a probe 24 electrically connected to the circuit 12 is inserted into the cell 18 for contacting the electrolyte 17. The probe 24 has an electrically conductive sensor member 26 comprising a rod of lead (Pb), such as a lead alloy, which is compatible with the sulfuric acid used in lead acid batteries. The sensor member 26 has an exposed face 28 at an end of the probe 24 which defines the first terminal 14 and which is positioned to contact and sense the electrolyte 17 at the predetermined minimum acceptable electrolyte level 16.

The probe 24 also has a non-conductive shell 30 within which the sensor member 26 is fixed. The shell 30 structurally reinforces the sensor member 26 which, comprising lead, is soft and weak. The shell 30 also electrically insulates the sensor member 26, other than the exposed face 28, to prevent false indications due to accidental contact between the probe 24 and other battery parts within the cell 18. The shell 30 preferably comprises a tubular structure made of a phenolic material compatible with the electrolyte 17. A non-corrosive, electrically insulating epoxy 32 fills the void between the sensor member 26 and the shell 30 to fix the sensor member 26 therein. The length of the probe 24 is chosen to extend through the cell cover 33 (FIG. 4) of the cell 18 and to position the exposed face 28 at the minimum acceptable electrolyte level 16.

Electrically connected in series to the circuit 12 between the first and second terminals 14, 20 is an indicator 34 that is responsive to the flow of current through the circuit 12. In the illustrated embodiment, the indicator comprises a light emitting diode (LED) which provides a visual indication of current flow. A blinking LED is preferable as it is easy to see.

One lead 36 of the LED indicator 34 is electrically connected to the sensor member 26 of the probe 24 as known in the art, such as by solder. The other lead 38 of the LED is connected through an insulated copper wire 40 to the second terminal 20 of the circuit 12, which, in the illustrated embodiment, comprises a ring terminal 41 which can be physically connected with a screw to an intercell connector as further discussed below.

A resistor 42 is electrically connected in parallel with the indicator 34. The resistor 42 reduces the sensitivity of the LED to low level currents in a manner known in the art.

A head cap 44 encloses the LED indicator 34, resistor 42, and the top end of the probe 24 to protect these from the environment.

Figure 3:
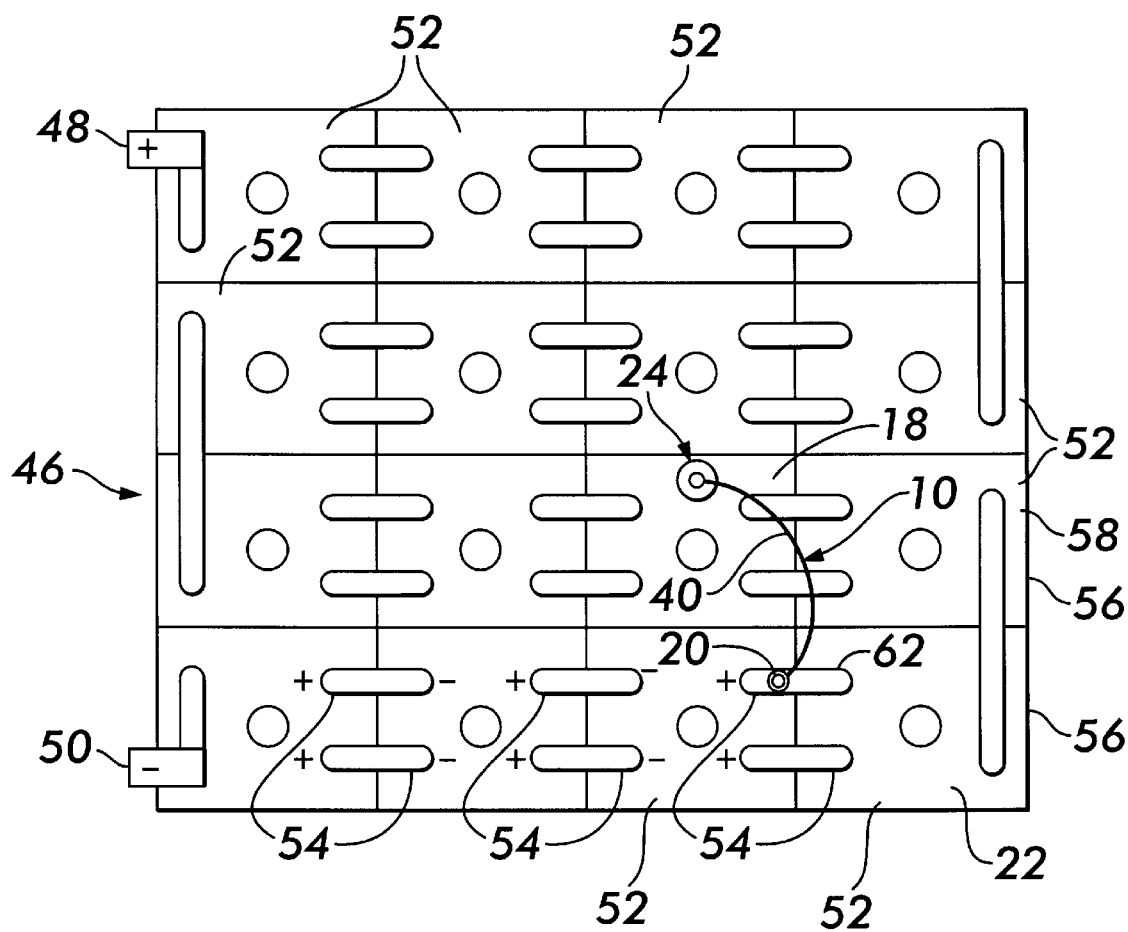
FIG. 3 is a top view of a battery of sixteen cells having an electrolyte monitor of the embodiment shown in FIG. 1.

With further reference to FIGS. 3 and 4, utilization of the monitor 10 is now described. Illustrated in FIG. 3 is a battery 46 having a positive terminal 48 and a negative terminal 50. The battery 46 is made up of sixteen cells 52 connected in series by intercell connectors 54. Each of the sixteen cells 52 has its own electrolyte level 19. The battery 46 of sixteen cells is for illustration purposes, it being understood that the present invention is readily applied to batteries made up of any number of cells in series that have a driving cell string for the monitor 10 as described below.

The monitor circuit 12 is powered by some of the cells of the battery 46 itself, and does not require an external power source. Each cell 52 of a typical battery provides a potential of about 2.2 volts. A suitable number of cells 52 in series adjacent to the monitored cell 18 serves as a driving cell string 56 to impress a potential across the circuit 12 (see FIG. 4). The LED indicator 34 of the present embodiment requires a potential of about 3–5 volts to turn on. Thus a driving cell string 56 of the two cells 22 and 58 in series is used to provide about 4.4 volts to operate the monitor 10.

As seen in FIGS. 3, 4, and 5, the first terminal 14 (exposed face 28 of probe 24 in the preferred embodiment) is placed in the pilot cell 18 in which the electrolyte 17 has been selected to be monitored. The first terminal 14 is fixed at the level 16 below which water should be added to the pilot cell 18.

The second terminal 20 of the circuit 12 is connected to the second cell 22 to impress a potential across the circuit 12 from the drive cell string 56. The second terminal 20 of the circuit 12 is connected in electrical contact with the negative terminal 61 of the cell 22, and preferably in such contact by being physically connected to the intercell connector 62. It is understood that electrical contact with the intercell connector 62 or the negative plate 60 of the cell 22 is in fact being in electrical contact with the negative terminal 61. Connecting the second terminal 20 of the circuit 12 to the intercell connector 62 on the outside of the cell 22 protects the second terminal 20 from the corrosive effects of the electrolyte within the cells. The ring terminal 41 allows the second terminal to be readily connected to the intercell connector 62 with a screw. The screw and terminal 41 can be coated with epoxy to protect them from external corrosion.

The monitored cell 18 is not believed to add any potential to that of the driving string 56 as the cell 18 is not included in the closed circuit. As shown in FIGS. 3 and 4, the circuit 12 is oriented so that the second cell 22 is positioned electrically between the first cell 18 having the first terminal 14, and the negative terminal 50 of the battery 46, i.e., the current flows through the circuit 12 in the same direction as the current flow through the battery 46—from positive (first terminal 14) to negative (second terminal 20). This orientation is preferable since the reverse orientation, placing the first terminal 14 in the cell 22 and the second terminal 20 of the circuit 12 to the positive terminal 64 of cell 18 would cause the lead material of probe 24 to be consumed by the electrochemical process.

Referring to FIG. 3, it is preferable to select a pilot cell 18 for monitoring from one of the inner rows of the cells 52. Surrounded by other cells, the inner cells tend to run hotter than the cells along the outer perimeter of the battery 46, and therefore are likely to have a lower electrolyte level at any given time. In this manner, the pilot cell 18 is indicative of all the cells of the battery which should be topped off at the same time cell 18 is topped off.

It is seen that the present invention provides a fail safe monitor of electrolyte level. As illustrated in FIG. 4, when the electrolyte 17 contacts the first terminal 14 a current flows through the circuit 12 causing the LED indicator 34 to illuminate. As long as the level of the electrolyte 17 remains in contact with the first terminal 14, at or above the level 16, the LED will remain lit. When the level of the electrolyte 17 drops below the level 16, contact with the first terminal 14 is broken, and the LED goes off. The device is fail safe in that a positive indication is given to indicate that the electrolyte level is at or above the minimum acceptable level 16. Lack of an indication means that the electrolyte level is low or that the monitor is not working properly. In either case an investigation of the battery is required.

The LED requires only a minimal current at a specific voltage to operate. Stray currents within a cell have been found to provide the minimal current necessary to give a positive indication in prior art monitoring devices even when the electrolyte level is below the minimum acceptable level. This problem is believed to have been previously unappreciated by those in the art.

The inventors recognized that a short circuit path from the electrolyte to the probe may develop within the cell 18. As a battery ages and is repeatedly cycled, oils are leeched from the separators within the cell such as those made of certain plastics. Aided by the gassing and splashing within the cell, these oils may mix with dirt and form an oily film that coats all exposed surfaces within the cell. This film is conductive and sustains a weak short circuit from the electrolyte, up the walls and onto the top cover of the battery cell, and to a probe device to give a false indication of an acceptable electrolyte level even though the actual level is below the minimum acceptable level.

Having recognized this problem, the inventors further developed a novel solution. The addition of a resistor 42 in parallel with the LED indicator 34 lowers the current through LED 34 for a given voltage across nodes X and Y, thereby requiring a higher current into node X to turn on the LED. By sizing the resistor 42 for the particular driving cell string voltage and LED utilized, the current required by the circuit 12 to light the LED can be made higher than that delivered through the oil film, thereby avoiding a false or impartial (dim) lighting of the LED.

In the illustrated example, the LED used is a blinking green, size T 1¾, having an input voltage of 3 V (Luminex part number SSL-LX5093BGD); the resistor used is an 82.5 Ohm, 1% metal film fixed resistor, ¼watt; for use with the two cell driving string 56.

The inventors have found that use of the present monitor has additional advantages. The industry recognizes that batteries should not be operated below 80% discharge which coincides with about an average voltage of 1.70 V per cell. To do so could damage the battery as well as the motor driven by the battery as the motor draws a higher current to compensate for the drop in voltage.

It has been found that around the discharge point of 80%, the monitor of the preferred embodiment stops working. This is believed to be when the voltage in each of the cells drop to about 1.7 volts. Thus, in the fail safe nature of this monitor 10, a lit LED indicates the electrolyte level is at or above the minimum acceptable level; while a non-lit LED indicates that an investigation is warranted and that there are at least three potential problems: 1) a low electrolyte level; 2) an improperly working monitor 10; or 3) the battery has discharged to the point that the battery should be recharged.

While the embodiment illustrated herein is designed as an after market device for installation in existing batteries, those in the art will recognize that similar and suitably modified devices can be incorporated in the battery during manufacture. It is understood that the foregoing description is intended to describe the preferred embodiment of the present invention and is not intended to limit the invention in any way. This invention is to be read as limited only by the appended claims.

What is claimed is:

1. A device for monitoring electrolyte level in a multi-celled battery, said device comprising:
    an electric circuit having a first terminal capable of being fixed within one of the battery cells at a minimum acceptable electrolyte level, and a second terminal capable of being electrically connected to a second of the battery cells;
    a probe having an electrically conductive sensor member, said sensor member connected electrically to said circuit and having an exposed face defining said first terminal to contact the electrolyte;
    an indicator electrically connected to said circuit between said probe and said second terminal, said indicator being responsive to a flow of current through said circuit; and
    a resistor electrically connected in parallel with said indicator.

2. A device in accordance with claim 1 wherein said probe further comprises a nonconductive outer shell within which is fixed said sensor member.

3. A device in accordance with claim 1 wherein said electrical circuit is closed so as to allow current to flow through said indicator when said electrolyte is at a level sufficient to contact said first terminal, whereby a positive indication of sufficient electrolyte is given.

4. A device in accordance with claim 2 wherein said indicator comprises a light emitting diode (LED).

5. A device in accordance with claim 4 wherein said sensor member comprises a rod including lead.

6. A device in accordance with claim 5 wherein said outer shell comprises a phenolic.

7. A device in accordance with claim 4 wherein said LED is fixed on top of said probe.

8. A device in accordance with claim 3 wherein said exposed face is positioned at an end of said probe.

9. A device in accordance with claim 4 wherein said LED has a rated input voltage of between about 3 and about 4 volts, and said resistor has an impedance of between about 79 and about 86 ohms.

10. An electrolyte level monitoring device, comprising:
    an electric circuit having a first terminal positionable at a minimum acceptable electrolyte level within one battery cell and a second terminal for electrical connection to a second battery cell;
    a probe having an electrically conductive sensor member and a nonconductive shell, said sensor member electrically connected to said circuit and having an exposed face defining said first terminal for contacting the electrolyte;
    an LED electrically connected in series between said first terminal and said second terminal; and
    a resistor electrically connected in parallel with said LED.

11. A battery having an electrolyte level monitor, said battery comprising:
    a negative terminal;
    multiple cells connected electrically in series to one another;
    an electrical circuit having a first terminal positioned at a minimum acceptable electrolyte level in a one of said cells to contact the electrolyte at said level, and a second terminal electrically connected to a second of said cells to impress a potential across said circuit when the electrolyte in said one cell contacts said first terminal;
    an indicator electrically connected in series between said first and second terminals, said indicator being responsive to a flow of current through said circuit; and
    a resistor electrically connected in parallel with said indicator.

12. A battery in accordance with claim 11 wherein said second terminal of said circuit is in electrical contact with a negative terminal of said second cell.

13. A battery in accordance with claim 12 wherein said negative terminal is electrically connected in series to another of said cells through an intercell connector, said second terminal of said circuit being physically connected to said intercell connector.

14. A battery in accordance with claim 12 wherein said second cell is positioned electrically between said one cell and the negative terminal of the battery.

15. A battery in accordance with claim 14 further comprising a driving cell string which comprises two of said multiple cells in series to impress a potential across said circuit.

16. A battery in accordance with claim 11 wherein said indicator comprises an LED.

17. A battery in accordance with claim 16 wherein said LED comprises a blinking LED.

18. A battery in accordance with claim 11 further comprising a probe electrically connected to said circuit, said probe having a sensor member comprising lead and an exposed face defining said first terminal.

19. A battery in accordance with claim 18 wherein said probe comprises a nonconductive outer shell within which said sensor member is fixed.

20. A battery in accordance with claim 13 further comprising an insulated wire electrically connected in series between said LED and said second terminal of said circuit.

21. A battery in accordance with claim 18 wherein said one of said cells includes a cell cover, said probe being supported by and extending through said cover into said one cell.

22. A battery in accordance with claim 11 further comprising a probe electrically connected to said circuit, said probe having an end defining said first terminal.

23. A device for monitoring electrolyte level in a battery having multiple cells, said device comprising:

an electric circuit having a probe capable of being positioned within one of said battery cells, said probe comprising an electrically conductive material and having a first terminal positionable at a minimum acceptable electrolyte level within said one of said battery cells;

a second terminal electrically connected to said electric circuit for electrical connection to a second one of said battery cells;

an indicator electrically connected in series between said first and said second terminals, said indicator being responsive to a flow of current through said circuit; and a resistor electrically connected in parallel with said indicator.

24. A device in accordance with claim 23 wherein said indicator comprises a light emitting diode (LED).

25. A device in accordance with claim 24 wherein said probe further comprises a nonconductive outer shell within which is said conductive material.

* * * * *